3,131,990
POLYPROPYLENE ARTICLES PEROXIDIZED AND GRAFTED WITH ACIDIC OR BASIC UNSATURATED MONOMERS AND THE PRODUCTION OF SAID ARTICLES
Alberto Bonvicini and Avito Monaci, Terni, and Vittorio Cappuccio, Milan, Italy, assignors to Montecatini Societa Generale per l'Industria Mineraria e Chimica, Milan, Italy
No Drawing. Filed May 1, 1958, Ser. No. 732,135
Claims priority, application Italy May 3, 1957
16 Claims. (Cl. 8—115.5)

This invention relates to dye-receptive shaped articles comprising linear poly (alpha olefins) and more particularly to such articles comprising prevailingly to substantially completely isotactic polypropylene.

Recently, G. Natta and his co-workers disclosed entirely new linear, regular head-to-tail polymers of the alpha-olefins $CH_2=CHR$, where R is a hydrocarbon radical. The new polymers may have different steric structures which Natta has termed "atactic" and "isotactic."

"Isotactic" defines a stereoregular structure characterized by the fact that, assuming the macromolecule main chain to be fully extended in a plane, the R groups bound to the tertiary asymmetric carbon atoms of adjacent monomeric units making up a given section of the main chain are on one side of the plane, and the hydrogen atoms bound to those carbon atoms are on the opposite side of the plane.

The atactic structures, on the other hand, are stereoirregular and characterized by the fact that, again assuming the macromolecule main chain to be fully extended in a plane, the R groups and the hydrogen atoms bound to the tertiary asymmetric carbon atoms of adjacent monomeric units are randomly distributed on both sides of the plane.

As Natta et al. have shown, the sterically different polymers may be obtained in admixture when the alpha-olefin is polymerized with the aid of catalysts prepared from metal alkyls like triethyl aluminum and high valency transition metal halides such as $TiCl_4$, and can be separated from the crude polymerizate on the basis of their different steric structures by means of selective solvents.

Also, as Natta et al. have further demonstrated, the polymerization of the alpha-olefins can be oriented to the direct production of a polymerizate consisting at least prevailingly of isotactic macromolecules by hydrocarbon solvent-insoluble catalysts prepared from the metal alkyl and a low valency transition metal halide of the type of violet $TiCl_3$.

The polymerizate consisting prevailingly of isotactic macromolecules, and particularly polypropylene, have characteristics, such as high mechanical strength, resistance to heat and chemicals, low density, etc. which make them particularly suitable for the production of shaped articles, such as fibers, yarns, films, tubes and molded objects generally.

However, a polymerizate consisting prevailingly of isotactic polypropylene is completely free of active groups capable of bonding chemically with substances which are chemically different from the polymer. This makes it difficult to modify the characteristics of the articles comprising the polypropylene. For example, the articles have no inherent affinity for either basic or acid type dyestuffs.

One object of this invention is to provide modified articles of the polypropylene which have an affinity for acid dyes and can be dyed readily therewith to good, fast colors, under conventional dyeing conditions.

Another object is to provide modified articles of the polypropylene which have an affinity for and can be dyed readily with basic dyes to good fast colors, using the conventional dyeing techniques.

A still further object is to provide methods for modifying the surface characteristics of shaped articles of the polypropylene in such manner that the articles are rendered wettable, more resistant to the accumulation of electrostatic charges, and dyeable with acid or basic dyes.

These and other objects of the invention are accomplished by grafting onto the polypropylene, at the surface of the article and after peroxidation of the latter, polymeric chains comprising monomeric units containing active basic groups which confer affinity for acid dyes to the article, or containing active acid groups which confer affinity for basic dyes thereto.

Polymeric chains comprising units derived from monomers containing active acid groups may be grafted onto the articles of the polypropylene by treating the article, in the peroxidized condition, with polymerizable monomers containing free active carboxyl or anhydride groups, such as acrylic acid or maleic anhydride.

On the other hand, the articles may be rendered receptive to the acid dyes in accordance with this invention by graft-copolymerizing thereon unsaturated polymerizable acid derivatives containing salt-forming amino groups, for example derivatives of methacrylic acid having the general formula

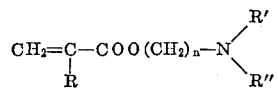

where R, R' and R'' are the same or different alkyl radicals containing from 1 to 6 carbon atoms, and n is comprised between 1 and 3.

The monomers containing free carboxylic groups, or salt-forming amino groups, can be graft-copolymerized onto the articles comprising peroxidized polypropylene alone or in the presence of other unsaturated compounds which are also capable of being graft-copolymerized on the polypropylene chains by a free radical mechanism. However, since the monomers containing free anhydride groups are less readily graft-copolymerized on polypropylene, it is generally desirable to use those monomers in mixture with an active monomer which is capable of being graft copolymerized readily on the polypropylene and which facilitates graft-polymerization of the anhydride in the form of a copolymer therewith. Active monomers which may be used as auxiliary graft-polymerizable substances include alkyl acrylates, alkyl methacrylates, styrene, acrylonitrile, vinylacetate, and vinylchloracetate. When the mixtures are used, they should comprise not more than 95% of the anhydride, such as maleic anhydride, and not less than 5% of the active, auxiliary monomer. In the final article, the grafted copolymeric chains are richer in the active monomer than the starting mixture.

The monomers used are polymerizable by means of a free radical mechanism, therefore having inherently at least one unsaturated bond, and the article to be modified is prepared for the graft-polymerization reaction by the introduction into the polypropylene chains of hydroperoxide groups which act as initiators of the free radical polymerization.

The hydroperoxide groups can be introduced by subjecting the article to superficial peroxidation. This can be accomplished by dipping the article into a gaseous medium containing from 10% to 100% of oxygen, at pressures varying from 1 to 10 atm. and at temperatures above 50° C., until 0.01 to 1.0% of oxygen (by weight of the polypropylene) is introduced in the form of hydroperoxide groups.

The articles thus prepared are then dipped in monomer or mixture of monomers to be grafted, the latter being either in the liquid or gaseous state or in solution in a solvent which is inert to the polypropylene. The hydroperoxide groups function, as already noted, as initiators for the graft copolymerization of the monomer or monomers and also constitute the graft point for the monomers which polymerize in relatively short chains on the polypropylene or other poly (alpha-olefin).

The graft copolymerization is carried out under any pressure and at temperatures of 50° C. to 100° C., which temperatures favor the free radical polymerization of the monomers of the types mentioned, without any appreciable depolymerization of the polypropylene.

Under the conditions mentioned, the mechanical properties of the polypropylene are undamaged.

After the graft-copolymerization reaction, the article is extracted at room or somewhat elevated temperature with a solvent which removes selectively any non-grafted monomer, as well as any non-grafted homopolymer that may have been formed. The article, which now contains active acid or basic groups, is then dried and thereafter can be dyed with basic or acid dyes depending on the polymeric chains grafted onto the polypropylene.

Excellent results have been obtained by dyeing various kinds of shaped articles, including fibers, films, tapes etc. of the modified polypropylene with a number of acid and basic dyes.

The following examples are given to illustrate the invention, it being understood that these examples are not intended to be limiting.

*Example 1*

A yarn formed from fibers of highly (over 80%) isotactic and crystalline polypropylene was peroxidized until it had a hydroperoxide group content of 0.60%. It was then dipped, in the absence of air, into a mixture of, by weight, 75 parts maleic anhydride and 25 parts methylmethacrylate, maintained at 70° C. The yarn was kept in the mixture for one hour, removed, and washed repeatedly with acetone until any non-grafted material adhering thereto was completely removed.

This yarn showed a definite affinity for the following dyes when dyed therewith under the standard conditions:

Malachite Green (Basic Green 4, Color Index No. 42,000, vol. I, page 1648)
Astrazon Blue BEG (Basic Blue 5, Color Index No. 42,140, vol. I, page 1640)
Deorlina brilliant yellow 5 GL (dye for polyacrylic fibers, Index, vol. IV)
Vesuvina G (Basic Brown 1, Color Index No. 21,000, vol. I, page 1649)
Cibacet Violet RB (Disperse Violet 15, Color Index, vol. I, page 1711)
Setacyl Yellow 5G (Disperse Yellow 19, Color Index, vol. I, page 1667)

The colors obtained had good fastness.

*Example 2*

A fabric woven from highly isotactic and crystalline polypropylene yarns was peroxidized to a hydroperoxide group content of 0.5% and then introduced into a mixture consisting of 75% by weight maleic anhydride and 25% by weight methylmethacrylate.

The mixture was heated to 70° C., and held at that temperature for 50 minutes in the absence of air.

The fabric was then withdrawn from the monomers, washed with acetone, and dried.

The amount of polymer grafted onto the fabric was about 10 to 12% by weight.

The fabric was dyed with the following basic dyes, using 5% dye solutions and operating for 1 hour at the boiling point of the dyebath according to the usual methods:

Malachite Green crystals (Basic Green 4, Color Index No. 42,000, vol. I, page 1648)
Astrazon Blue BEG (Basic Blue 5, Color Index No. 42,140, vol. I, page 1640)
Deorlina brilliant Yellow 5 BL (dye for polyacrylic fibers, Index, vol. IV)
Chrysoidine G (Basic Orange 2, Color Index No. 11,270, vol. I, page 1623)

Very good, fast colors were obtained.

*Example 3*

A fabric woven from yarns of highly isotactic and crystalline polypropylene was peroxidized to a content of 0.55% hydroperoxide groups and then immersed in an equimolar mixture of maleic anhydride and styrene. The mixture was heated to 70° C. and was held at that temperature for about 30 minutes in the absence of air. The fabric was then withdrawn, washed repeatedly with acetone until the non-grafted polymer was removed completely, and dried.

The fabric showed a weight increase of about 12% as a result of the grafting and had good affinity for the following dyes:

Deorlina brilliant Yellow 5 GL (dye for polyacrylic fibers, Index Vol. IV)
Astrazon Blue BEG (Basic Blue 5, Color Index No. 42,410, vol. I, page 1640)
Malachite Green (Basic Green 4, Color Index No. 42,000, vol. I, page 1648)
Astrazon Red (Basic Violet 7, Color Index No. 48,020, vol. I, page 1635)
Methyl Violet N (Basic Violet 1, Color Index No. 42,535, vol. I, page 1633)

*Example 4*

Staple fibers of highly isotactic and crystalline polypropylene were peroxidized to a hydroperoxide group content of 0.36% and then immersed in a 5% aqueous acrylic acid solution. The solution was then heated to 70° C. and held at that temperature for 2 hours in the absence of air. The staple was removed, washed with 2–3% aqueous sodium hydroxide until the nongrafted polyacrylic acid was completely removed, and then dyed to good, fast colors with the following dyes:

Astrazon Red (Basic Violet 7, Color Index No. 48,020, vol. I, page 1635)
Malachite Green (Basic Green 4, Color Index No. 42,000, vol. I, page 1648)
Astrazon Blue BEG (Basic Blue 5, Color Index No. 42,140, vol. I, page 1640)
Celliton Blue BTNU (Disperse Blue 1, Color Index No. 64,500, vol. I, page 1713)
Setile Pink BN (Disperse Red 15, Color Index No. 60,710, vol. I, page 1694)
Setacyl Yellow 3G (Disperse Yellow 20, Color Index, vol. I, page 1667)

*Example 5*

A film of highly isotactic polypropylene was peroxidized until it contained 0.41% peroxidic oxygen. It was then immersed in a 5% aqueous acrylic acid solution.

The solution was heated to 70° C., and kept at that temperature for 2 hours in the absence of air.

After washing with dilute aqueous sodium hydroxide to remove any non-grafted acrylic and polyacrylic acid adhering to it, the film was dyed with the following dyes, for which it exhibited a strong affinity:

Malachite Green crystals (Basic Green 4, Color Index No. 42,000, vol. I, page 1648)
Astrazon Blue BEG (Basic Blue 5, Color Index No. 42,140, vol. I, page 1640)
Setacyl Yellow 3G (Disperse Yellow 20, Color Index, vol. I, page 1667)

*Example 6*

A fabric woven from yarns of highly isotactic and crystalline polypropylene was peroxidized to a hydroperoxide oxygen content of 0.6% and then immersed in liquid diethylaminoethyl methacrylate. The liquid was then heated to 70° C. for 5 hours, in the absence of air.

The fabric was removed, washed with methylethylketone until any unreacted monomer and the poly (meth-acrylate) were removed, and then dried.

The fabric thus obtained is dyed very easily with the following acid dyes:

Fast Red A (Acid Red 88, Color Index No. 15,620, vol. I, page 1130)
Alizarine Blue ACF (Acid Blue 25, Color Index No. 62,055, vol. I, page 1240)
Roracyl Violet 2R (dye for polyacrylic fibers, Index, vol. IV)

*Example 7*

A fabric woven from yarns of isotactic polypropylene was peroxidized to a hydroperoxide oxygen content of 0.6% and then immersed in a liquid mixture of diethylaminoethyl methacrylate and methylmethacrylate containing the monomers in a molar ratio of 1:1. The mixture was heated to 70° C. for 4 hours, in the absence of air.

After being washed with methylethylketone to remove any unreacted monomers, and then dried, the modified fabric was dyed readily with the following acid wool dyes under conventional conditions:

Fast Follone Red B (Acid Red 85 plus Acid Red 99, Color Index, vol. I, pages 1128 and 1135)
Impero Blue 6B (Acid Blue 83, Color Index No. 42,660, vol. I, page 1267)
Roracyl Orange (dye for polyacrylic fibers, Index, vol. IV)
Irgalan Brown Violet DL (Acid Violet 78, Color Index, vol. I, page 1227)

Various changes in details may be made in practicing the invention, for example in the choice of the monomer containing acid or basic groups which is graft-polymerized on the peroxidized polypropylene, the solvent used to remove non-grafted material adhering to the article, and so on. Since these and other changes can be made without departing from the spirit of the invention, we intend to include them, and all other modifications as may be apparent to those skilled in the art, within the scope of the appended claims.

What is claimed is:

1. In a process for rendering manufactured shaped articles comprised of polypropylene consisting at least prevailingly of isotactic macromolecules receptive to a dye selected from the group consisting of acid dyes and basic dyes, without any substantial change in the mechanical properties of the articles, which process comprises peroxidizing the polypropylene substantially exclusively at the surface of the article by dipping the article in a gaseous medium containing from 10% to 100% of oxygen, at a pressure of from 1 to 10 atmospheres, and at a temperature above 50° C., until about 0.01 to about 1.0% of oxygen by weight is introduced into the polypropylene in the form of hydroperoxide groups, the improvement being the application to the superficially peroxidized article, at a temperature between 50° C. and 100° C., an unsaturated monomer which is selected from the group consisting of methacrylic acid derivatives having the general formula

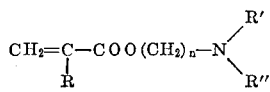

in which R, R' and R" are alkyl radicals containing from 1 to 6 carbon atoms and $n$ is an integer from 1 to 3 inclusive, and mixtures thereof with methyl methacrylate, when the article is to be rendered receptive to acid dyes; and which is a mixture of maleic anhydride with a member selected from the group consisting of methyl methacrylate and styrene when the article is to be rendered receptive to basic dyes; thereby graft-copolymerizing chains of monomeric units containing active basic, respectively active acid groups, onto the polypropylene chains at the surface of the article, and thereafter removing from the treated article any residual monomer and non-grafted polymer adhering thereto.

2. The process according to claim 1, characterized in that the unsaturated monomer applied to the article is a methacrylic acid derivative having a formula as given in claim 1.

3. The process according to claim 1, characterized in that maleic anhydride is applied to the article in admixture with a substance selected from the group consisting of methyl methacrylate and styrene.

4. The process of claim 3 wherein the maleic anhydride comprises less than 95% of the admixture and a substance selected from the group consisting of methyl methacrylate and styrene comprises more than 5% of the admixture.

5. The process of claim 7 wherein the maleic anhydride comprises less than 95% of the admixture and methyl methacrylate comprises more than 5% of the admixture.

6. The process of claim 8 wherein the maleic anhydride comprises less than 95% of the admixture and styrene comprises more than 5% of the admixture.

7. The process of claim 1, characterized in that maleic anhydride is applied to the article in admixture with methyl methacrylate.

8. The process of claim 1, characterized in that maleic anhydride is applied to the article in admixture with styrene.

9. The process according to claim 1, characterized in that diethylaminoethyl methacrylate is applied to the article.

10. The process according to claim 1, characterized in that diethylaminoethyl methacrylate is applied to the article in admixture with methyl methacrylate.

11. Shaped solid manufactured articles comprised of polypropylene consisting at least prevailingly of isotactic macromolecules, said articles being selected from the group consisting of basic dye-receptive articles and acid dye-receptive articles, the basic-dye-receptive articles comprising at the surface thereof, graft-copolymers of the polypropylene with monomers selected from the group consisting of mixtures of maleic anhydride and a monomer selected from the group consisting of methyl methacrylate and styrene, and the acid-dye-receptive articles comprising, at the surface thereof, graft-copolymers of the polypropylene with monomers selected from the group consisting of methacrylic acid derivative having the general formula

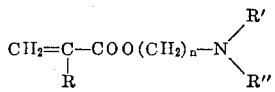

in which R, R' and R" are alkyl radicals containing from 1 to 6 carbon atoms and $n$ is an integer from 1 to 3 inclusive, and mixtures of said derivatives with methyl methacrylate.

12. Shaped solid manufactured articles comprised of polypropylene consisting at least prevailingly of isotactic macromolecules, said articles comprising, at the surface thereof, graft copolymers of the polypropylene with maleic anhydride and methyl methacrylate, and being receptive to basic dyes.

13. Shaped solid manufactured articles comprised of polypropylene consisting at least prevailingly of isotactic macromolecules, said articles comprising, at the surface thereof, graft copolymers of the polypropylene with maleic anhydride and styrene, and being receptive to basic dyes.

14. Shaped solid manufactured articles comprised of polypropylene consisting at least prevailingly of isotactic macromolecules, said articles comprising, at the surface thereof, a graft copolymer of the polypropylene with a methacrylic acid derivative having the general formula

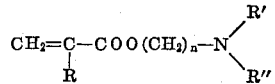

in which R, R' and R" are alkyl radicals containing from 1 to 6 carbon atoms, and $n$ is an integer from 1 to 3 inclusive, said articles being receptive to acid dyes.

15. Shaped solid manufactured articles comprised of polypropylene consisting at least prevailingly of isotactic macromolecules, said articles comprising, at the surface thereof, a graft copolymer of the polypropylene with diethylaminoethyl methacrylate, and being receptive to acid dyes.

16. Shaped solid manufactured articles comprised of polypropylene consisting at least prevailingly of isotactic macromolecules, said articles comprising, at the surface thereof, graft copolymers of the polypropylene with diethylaminoethyl methacrylate and with methylmethacrylate, and being receptive to acid dyes.

References Cited in the file of this patent
UNITED STATES PATENTS

| | | |
|---|---|---|
| 2,794,793 | Coover | June 4, 1957 |
| 2,837,496 | Vandenberg | June 3, 1958 |
| 2,921,044 | Coover | Jan. 12, 1960 |
| 3,020,174 | Natta et al. | Feb. 6, 1962 |
| 3,022,191 | Cappuccio et al. | Feb. 20, 1962 |

FOREIGN PATENTS

| | | |
|---|---|---|
| 1,125,537 | France | July 16, 1956 |
| 1,130,099 | France | Sept. 17, 1956 |

OTHER REFERENCES

Natta: Journal of Polymer Science, XVI, 143–154 (1955).